(12) United States Patent
Duperray

(10) Patent No.: US 8,918,060 B2
(45) Date of Patent: Dec. 23, 2014

(54) 2G, 2.5G RF LOOPBACK ARRANGEMENT FOR MOBILE DEVICE SELF-TESTING

(75) Inventor: David Duperray, Austin, TX (US)

(73) Assignee: ST-Ericsson SA, Plan-les-Ouates (CH)

( * ) Notice: Subject to any disclaimer, the term of this patent is extended or adjusted under 35 U.S.C. 154(b) by 378 days.

(21) Appl. No.: 13/248,106

(22) Filed: Sep. 29, 2011

(65) Prior Publication Data

US 2013/0084852 A1  Apr. 4, 2013

(51) Int. Cl.
*H04B 17/00* (2006.01)
(52) U.S. Cl.
CPC ........ *H04B 17/0027* (2013.01); *H04B 17/0022* (2013.01)
USPC .................. 455/67.14; 455/67.11; 455/67.13
(58) Field of Classification Search
USPC ....................... 455/67.11, 67.14, 69
See application file for complete search history.

(56) References Cited

U.S. PATENT DOCUMENTS

| 5,442,811 | A | 8/1995 | Kobayashi et al. |
| 5,594,950 | A | 1/1997 | Blumbert, Jr. et al. |
| 2005/0090245 | A1* | 4/2005 | Kim .............................. 455/425 |
| 2007/0241816 | A1* | 10/2007 | Okazaki et al. ................ 330/149 |
| 2007/0280185 | A1* | 12/2007 | McFarland et al. ........... 370/338 |
| 2007/0297537 | A1 | 12/2007 | Luce |
| 2008/0144707 | A1* | 6/2008 | Tsfati et al. ................... 375/224 |
| 2009/0227214 | A1 | 9/2009 | Georgantas et al. |
| 2010/0177811 | A1 | 7/2010 | Duerdodt et al. |

FOREIGN PATENT DOCUMENTS

| CN | 101090302 A | 12/2007 |
| EP | 1351418 A2 | 8/2003 |

OTHER PUBLICATIONS

Patent Cooperation Treaty: International Search Report of PCT/EP2012/068806 (related application); Nov. 30, 2012; van der Pol, Edwin; 4 pages.
Charlon O. et al.; "A low-power high-performance SiGe BiCMOS 802.11a/b/g transceiver IC for cellular and Bluetooth co-existence applications," Solid-State Circuits Conference, 2005. ESSCIRC 2005. Processing of the 31st European, IEEE, Piscataway, NJ, USA, Sep. 12, 2005; pp. 129-132, XP010854921, DOI: 10.1109/ESSCIR.2005.1541576; ISBN: 978-0-7803-9205-2.

* cited by examiner

*Primary Examiner* — Yuwen Pan
*Assistant Examiner* — Fatuma Sherif
(74) *Attorney, Agent, or Firm* — Howison & Arnott, LLP

(57) ABSTRACT

In a mobile communication device a loopback technique is used to enable the receive chain circuitry and digital baseband block to perform self tests on the transmit chain circuitry of the same mobile communication device for 2G and 2.5G operating Bands and channels. A transmit chain circuit is set to transmit a selected receive Band channel, which is attenuated via a loopback path within the mobile communication device's front end module and, in some embodiments, via a leakage signal path between adjacent or proximate LNA inputs of separate receive chain circuits.

19 Claims, 4 Drawing Sheets

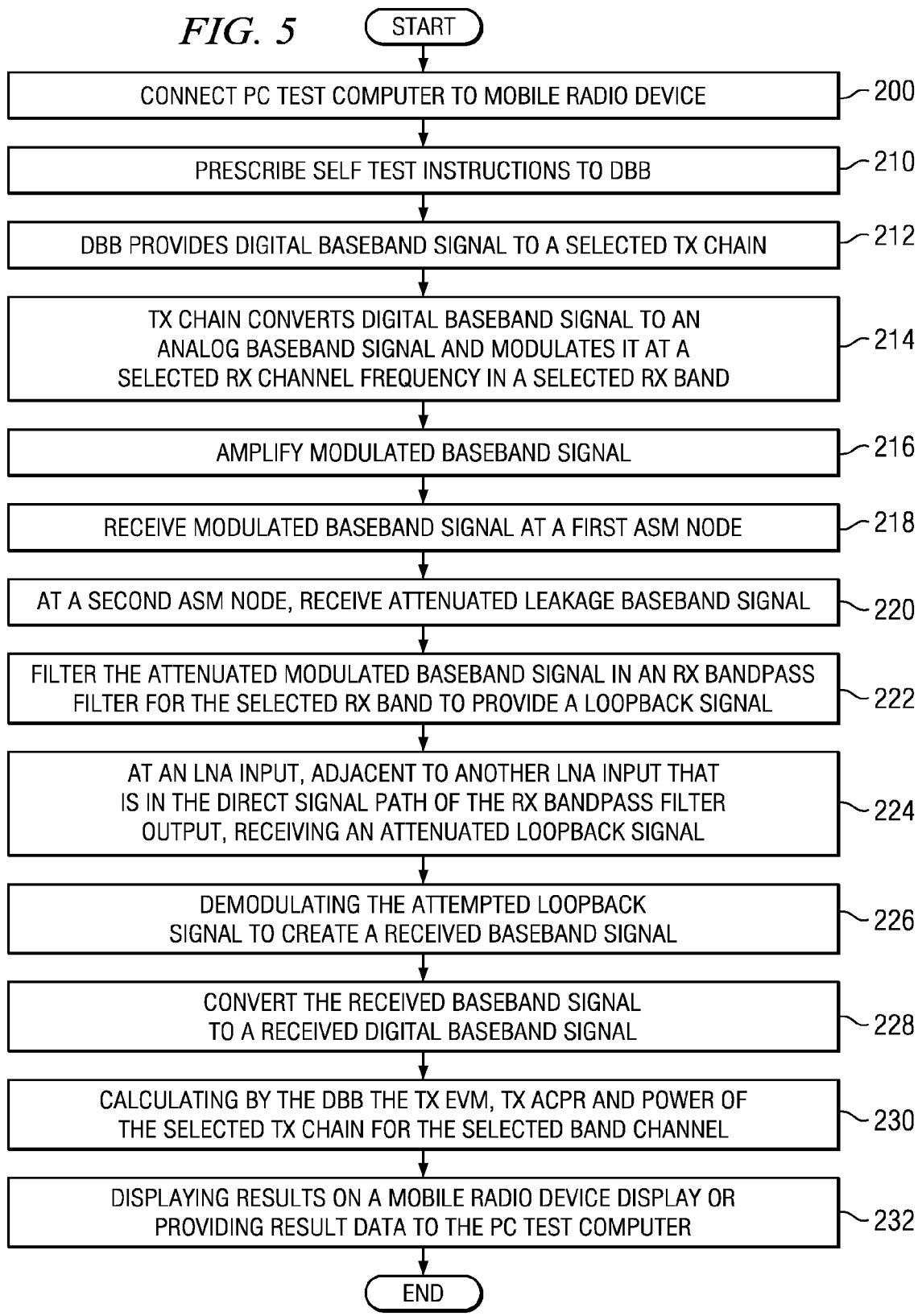

US 8,918,060 B2

2G, 2.5G RF LOOPBACK ARRANGEMENT FOR MOBILE DEVICE SELF-TESTING

TECHNICAL FIELD

Embodiments of the invention relate to testing transmit chain circuitry of mobile communication device circuitry. More particularly, embodiments of the present invention relate to methods for mobile communication device circuitry to perform self tests.

BACKGROUND

Today's mobile communication devices, including mobile phones, are multi-mode (2G, 2.5.G, 3G, 4G, LTE) multi-band (Band I, II, V, VII, etc.) devices. The transmit and receive circuitry of each mobile communication device must be calibrated and tested during fabrication in order to verify that the devices meet the standardization requirements as defined by the mobile communication standardization bodies, the phone manufacturers and the wireless network operators. Furthermore, advanced testing techniques are used to lower the probability that a fabricated mobile device component and/or the resulting fabricated mobile device is not returned to the manufacturer as defective.

Testing of mobile communication circuitry may be performed on the transmit chain of the mobile device communication circuitry to test the Error Vector Magnitude (EVM), Adjacent Channel Power Ratio (ACPR), the transmit power and the modulated spectrum at various frequency offsets to name a few. These tests are used to determine whether the transmission chain(s) are operational, as well as whether the transmission chain(s) are operating within government and industry defined parameters and limitations. The EVM is a quantification measurement used to quantify the performance of a digital radio transmitter or receiver. For example, an EVM is the quantification of the difference between the actual received symbols and ideal symbols.

Presently, very expensive external test equipment is connected to or probes the antenna output node of the mobile device radio circuitry to perform such transmit chain testing. Once connected, it takes a significant amount of time to set up the external test equipment, to program the mobile device radio circuitry, set up the test, set up the receiving test equipment to be calibrated and to read the expected signal, to run each test, process the data for each test, and finally to make a determination as to whether the circuit under test passed or failed the battery of tests.

Referring to FIG. 1, a transmit chain test set up using external test and measurement equipment is depicted. The mobile device 10 that comprises a multitude of components is shown. For simplicity, only a few of the many components that may exist within a mobile device 10 are depicted. One of ordinary skill in the art would understand that additional circuitry and elements are found in a mobile device 10. A Front End Module (FEM) 12 is shown being connected to the radio circuitry 14. The FEM 12 is a separate chip or circuit from the radio circuitry 14. The radio circuitry 14 is basically divided into two portions being receiver circuitry 16 and transmitter circuitry 18. The transmitter circuitry 18 may have a plurality of transmission chains 20, 22. Each transmission chain may be designated for a specific operating band. For example, transmission chain 20 may be designated for transmitting in the Band II frequency domain, which transmits channels between the 1850 to 1910 megahertz. Meanwhile, transmission chain 22 may be for transmitting Band VIII, which transmits channels (having about a 0.2 megahertz width) between the frequencies of 880 to 915 megahertz.

The receiver circuitry 16 similarly may have a plurality of receiver chains 24, 26. Receiver chain 24 may be for receiving channels within Band II, which will be between 1930 to 1990 megahertz. Receiver chain 26 may be designated for receiving channels within frequency Band VIII, which is between 925 to 960 megahertz.

The Digital Baseband (DBB) block 28 receives a down converted modulated carrier or baseband signal and may be used to convert the received baseband signal to data that can be used by other circuitry within the mobile device. For example, the DBB block may convert a received baseband signal into text messages or digital audio data to be used by other circuitry within the mobile device (not specifically shown). The digital baseband block 28 may comprise a plurality of microprocessors and other circuitry to create or decode digital baseband transmission and reception signals sent over a selected transmission chain band or received via a specific receiver chain band.

For simplicity and for better understanding only two transmitter chain circuits 20 and 22 are depicted in FIG. 1. It is understood that there may be a plurality of transmitter chains in the transmitter circuitry 18. Furthermore, only two receiver chains 24, 26 are depicted in the receiver circuitry 16. It is further understood that additional receiver chains may exist in exemplary embodiments of the invention.

To test, for example, transmitter chain 20 a relatively inexpensive computer or PC set-up device 30 may be connected via a data bus 32 to the mobile device 10, or in particular, to the DBB block 28. The PC test set-up device 30 operates in conjunction with the external test and measurement equipment 34. The external test and measurement equipment 34 is typically an extremely expensive piece of equipment (can cost in the hundreds of thousands of dollars) that is adapted to measure power, perform frequency analysis, measure power in the frequency domain and to demodulate the modulated carrier to compute EVM, ACPR (Adjacent Channel Leakage Power Ratio) and the modulated spectrum of a transmit signal. The external test and measurement equipment 34 is connected to an antenna node 36 via a probe or other connection 38. The antenna node 36 is located on the FEM chip or circuit where a mobile device antenna would normally be connected, but testing of the transmit chains of a mobile device's circuitry is normally done prior to the connection of an antenna to the antenna node 36.

The PC set-up device 30, via the bidirectional bus 32, sets the FEM 12 to switch the Antenna Switch Module (ASM) 40 such that the output of the power amp 42 in the transmitter chain 20 is connected to the antenna node 36, via input node 41, so that the modulated carrier signal originating from the Band II transmit chain circuitry 20 can be read by the probe connection 38 of the external test and measurement equipment 34. The modulated carrier goes through the ASM 40 directly to the external test and measurement equipment 34 via the probe connection 38. The PC test set-up device 30 informs the external test and measurement equipment 34 that it will be testing a first channel in Band II via transmitter chain 20. The external test equipment 34 then configures itself via switches, communication pipes and settings to receive the designated channel of the designated band so that test measurements can be taken and recorded. After test measurements are recorded, the PC test set-up device 30 may inform the external test and measurement equipment 34 that it will now be testing a different channel of Band II via the transmitter chain 20. Again, the external test and measurement equipment must recalibrate itself and adjust to receive and measure the signal of the next test. This process continues until the multitude of tests needed to be performed on the various transmitter Band chains 20, 22 (and others not specifically shown) are completed.

This technique of testing transmission chains provided from a digital baseband block 28, transmitter circuitry 18, FEM circuitry 12, and an external test and measurement device requires that a multitude of connections, relays communication pipes and programming of the additional expensive test and measurement equipment 34 be incorporated into every test of every mobile communication device. Thus, using the external test and measurement equipment 34 is a relatively inefficient technique for testing the multitude of transmission chains within the circuitry of a many mobile devices during their fabrication. Again, the external test and measurement equipment 34 may cost several hundred thousand dollars to purchase and furthermore requires costly ongoing maintenance and calibration.

The external test and measurement equipment 34 tests the EVM, the ACPR, or ALCR the modulated spectrum and other parameters for each 2G and 2.5G Band to determine whether the device under test is transmitting within predetermined range limits and determines whether the device under test passes or fails. If the mobile device circuitry fails, it is removed from the fabrication line and if it passes it continues on to potentially be incorporated into a completely fabricated mobile device.

It should be understood that a Band is defined per the U.S. Federal Communications Commission (FCC) definitions. For example, transmit Band II is defined by a plurality of channels that are between two frequencies. For the transmit Band II, the plurality of channels are between 1850 megahertz and 1910 megahertz. In 2G and 2.5 G communication each channel within a Band has a bandwidth of about 0.2 megahertz. Therefore there can be about 100 channels within, for example, transmit Band II. Realistically, it would take too long to test all the channels within each of the 2G or 2.5G Bands. Thus, what is normally done is a test on a lower frequency channel, a mid frequency channel and a high frequency channel within each transmit Band in order to increase the probability that the transmitter chain for the specific transmit band operates properly for all the channels within that transmit Band. This is done for each 2G and 2.5G transmit chain in the transmitter circuitry portion 18 using the external test and measurement equipment 34. Presently, there are five operating bands for 2G and 2.5 G communications. These Operating Bands are Bands II, III, V, VI and VIII, which each have a transmit frequency range and a receive frequency range as depicted in Table 1 below.

TABLE 1

2 G and 2.5 G frequency bands

| Operating Band | UL frequencies UE transmit, node b receive | DL frequencies UE receive, Node B transmit |
|---|---|---|
| II | 1850-1910 MHz | 1930-1990 MHz |
| III | 1710-1785 MHz | 1805-1880 MHz |
| V | 824-849 MHz | 869-894 MHz |
| VI | 830-840 MHz | 875-885 MHz |
| VIII | 880-915 MHz | 925-960 MHz |

Thus, what is needed is a less expensive and less time consuming method of testing the transmission chain Bands of a mobile device's radio circuitry. Such a solution could remove the need for purchasing and maintaining very expensive external test equipment, would decrease the amount of time required to test each mobile device radio's transmission chain, and would ultimately decrease the overhead cost of testing mobile device circuitry.

SUMMARY

To meet the need of providing a method of testing the transmit chain circuitry of a mobile communication device without the use of expensive external test and measurement equipment, an exemplary self test method is provided that incorporates a signal loopback technique that enables the receive chain circuitry and digital base band block circuitry of a mobile communication device to perform self tests on the transmit chain circuitry of the same mobile communication device for 2G and 2.5 G operating Bands and their associated channels. A transmit chain circuit that requires testing is set to transmit a selected receive Band channel, which is attenuated via a loopback path with the mobile communication device's front end module and, in some embodiments, via a leakage signal path between adjacent or proximate Low Noise Amplifier (LNA) inputs of separate receive chain circuits. Furthermore, since the digital baseband block of an exemplary mobile device's circuitry comprises a plurality of microprocessors and advanced computational abilities, embodiments establish a method of using the mobile device radio's receiver chain(s) to enable self testing of the mobile device radio's transmission chain(s) without the use of expensive external test equipment connected to the mobile device radio's antenna output.

In some embodiments, a loopback self test method for testing a transmission chain of a mobile communication device is accomplished by comprising the steps of producing, by a selected RF transmit circuit portion of the mobile communication device, a modulated baseband signal having a preselected channel frequency of a preselected Band's receive frequency range. The modulated baseband signal is then amplified and provided to a first node of an antenna switch module. Via a first leakage signal path, a second node of the antenna switch module that is isolated from the first node, receives the amplified modulated baseband signal as a first attenuated signal, which is an attenuated version of the amplified modulated baseband signal. The attenuated signal is filtered by a first bandpass filter that is adapted to pass the preselected Band's receive frequency range and to output the filtered signal as a loopback signal. The loopback signal is received by a first low noise amplifier (LNA) in a first RF receive circuit portion of the mobile communication device circuitry, the first RF receive circuit portion being adapted to demodulate and convert the loopback signal into a received digital representation of the baseband signal that was part of the modulated baseband signal produced by the selected RF transmit circuit. The received digital representation of the baseband signal is provided to a Digital Base Band (DBB) block wherein calculations are preformed by hardware and/or software utilized by the DBB block to determine an estimation of the transmit Error Vector Magnitude (EVM) and the transmit power of the selected RF transmit circuit portion of the transmission chain being tested.

In additional embodiments of an exemplary self test method, the DBB block further calculates and/or estimates an Adjacent Channel Power Ratio (ACPR) of the selected RF transmit circuit after a plurality of preselected channels within the operating Band's frequency range are tested via the loopback self test method.

In additional embodiments of an exemplary self test method, the first attenuated signal is attenuated about 20 to 30 dB between the first node and the second node of the antenna switch module.

In another embodiment of an exemplary self test method, the first LNA is in an indirect receive signal path with respect to the output of the first bandpass filter such that the loopback signal attenuates 30 to 40 dB between the output of the first bandpass filter and the input of the first LNA. The first LNA input is adjacent to a second LNA input that is in a direct signal path with the output of the first bandpass filter.

In yet an additional embodiment of an exemplary self test method the loopback signal is received as an attenuated loopback signal by the first LNA via a second leakage signal path, the second leakage signal path being between the output of the bandpass filter and the first LNA, the output of the first bandpass filter and the first LNA not being directly connected such that the loopback signal is attenuated by the second leakage signal path to become an attenuated loopback signal, wherein the attenuated loopback signal is a further attenuated version of the attenuated version of the amplified modulated baseband signal.

In some embodiments, self test instructions are provided by an external computer device adapted to provide instructions and receive digital data from the mobile communication device under test.

In another embodiment of an exemplary mobile communication device self test method a baseband signal is produced by a digital base band block within the mobile communication device circuitry. The baseband signal is received by a predetermined RF transmit circuit chain within the mobile communication device circuitry. The base band signal is modulated to produce a modulated baseband signal at a predetermined first receive channel frequency that is within a predetermined first operating Band frequency range. The modulated baseband signal is amplified in a Front End Module (FEM) of the mobile communication device circuitry and provided to a first node of an Antenna Switch Module (ASM) within the FEM. The amplified modulated baseband signal is then, via signal leakage from the first node, received at a second node of the ASM as a first attenuated baseband signal. The first attenuated baseband signal is provided to a bandpass filter that is adapted to pass a modulated baseband signal with the first operating band frequency. The output of the bandpass filter may be referred to as a loopback signal. The loopback signal being the filtered and attenuated modulated baseband signal.

Additional embodiments further comprise receiving the loopback signal by a predetermined RF receive chain circuit within the mobile communication device circuitry and demodulating the loopback signal to produce a received baseband signal, which is a representation of the baseband signal produced by the digital baseband block circuitry. The received baseband signal is then provided to the digital baseband block circuitry wherein the processing power of the digital baseband is used to calculate the Error Vector Magnitude (EVM) of the predetermined RF transmit circuit chain from the received baseband signal.

In some embodiments the predetermined RF receive chain circuitry is in direct signal connection with the output of the bandpass filter to receive the loopback signal. In other embodiments the predetermined RF receive chain is not in direct signal connection with the output of the bandpass filter such that the predetermined RF receive chain receives the loopback signal as an attenuated loopback signal via signal leakage from an output node that is in direct signal connection with the output of the bandpass filter. In some embodiments the predetermined RF receive chain circuitry input is adjacent to the input of another RF receive chain circuitry input that is in direct signal connection with the output of the bandpass filter.

In various embodiments, the exemplary self test method is used to test 2G and 2.5G transmit chain circuitry in a mobile communication device.

In yet additional embodiments, a mobile communication device is provided that comprises mobile radio circuitry. The mobile radio circuitry comprises at least one transmit chain and at least one received chain. Furthermore, a digital base band block is electrically connected to the at least one transmit chain and the at least one receive chain. The digital base band block is adapted to provide parameters or signals to the transmit chain such that the transmit chain modulates the self test signal at a selected receive channel frequency. The digital baseband block is also adapted to provide a signal to an antenna switch module that indicates a selected switch configuration to which the antenna switch module should switch. The digital baseband block is further adapted to set the receive chain to receive an attenuated signal from a selected node of the antenna switch, wherein the attenuated signal comprises the self test signal. The digital baseband block provides a demodulation signal to the receive chain enabling, thereby enabling the receive chain to demodulate a received self test signal from the selected receive channel frequency. The digital baseband block is further adapted to receive the received self test signal from the receive chain as a received digital baseband self test signal and then analyze the received digital baseband self test signal.

In related embodiments, the digital baseband block is adapted to analyze the received digital baseband self test signal to calculate a quantification measurement, such as EVM, power, ACPR or ACLR.

In another embodiment of the invention a system for self testing a transmission chain in a mobile phone radio device is provided. The system comprises a digital base band block that comprises at least one processor, a transmit chain is adapted to receive a test signal from the digital base band block, a receive chain adapted to provide a received test signal to the digital base band block, an antenna switch module connected to receive a transmit signal at a first node and a switch control signal from the digital base band block, a processor readable medium (i.e., a memory device or circuit) electronically coupled to the at least on processor, and a plurality of instructions, wherein at least a portion of the instruction are storable in the processor readable medium. The plurality of instructions can be configured to cause at least one of the processors to perform a variety of functions and to provide signals and/or instructions to various other components or circuits within or about the mobile phone radio device. For example, the instructions can cause at least one of the processors to instruct the base band block to produce a base band test signal; to instruct the transmit chain to receive the base band test signal; to instruct the transmit chain to modulate the base band test signal to produce a modulated base band test signal within a first channel of a selected receive frequency band; to instruct the antenna switch module to be configured to switch to the first node or; to instruct the receive chain to receive a loopback signal from a second node of the antenna switch module, wherein the loopback signal comprises an attenuated version of the modulated base band test signal. Additionally, the plurality of instructions can be further configured to cause at least one of the processors to instruct the receive chain to demodulate a received base band test signal from the loopback signal and provide the received base band test signal to the digital base band block and instructions for the digital base band block to analyze the received base band test signal for EVM, power, ACPR or ACLR related information and data.

BRIEF DESCRIPTION OF THE DRAWINGS

For a more complete understanding, reference is now made to the following description taken in conjunction with the accompanying Drawings in which:

FIG. 5 illustrates a flow chart of an exemplary self test method for a mobile device's transmit chain in accordance with an embodiment of the invention.

DETAILED DESCRIPTION

Figure 1:
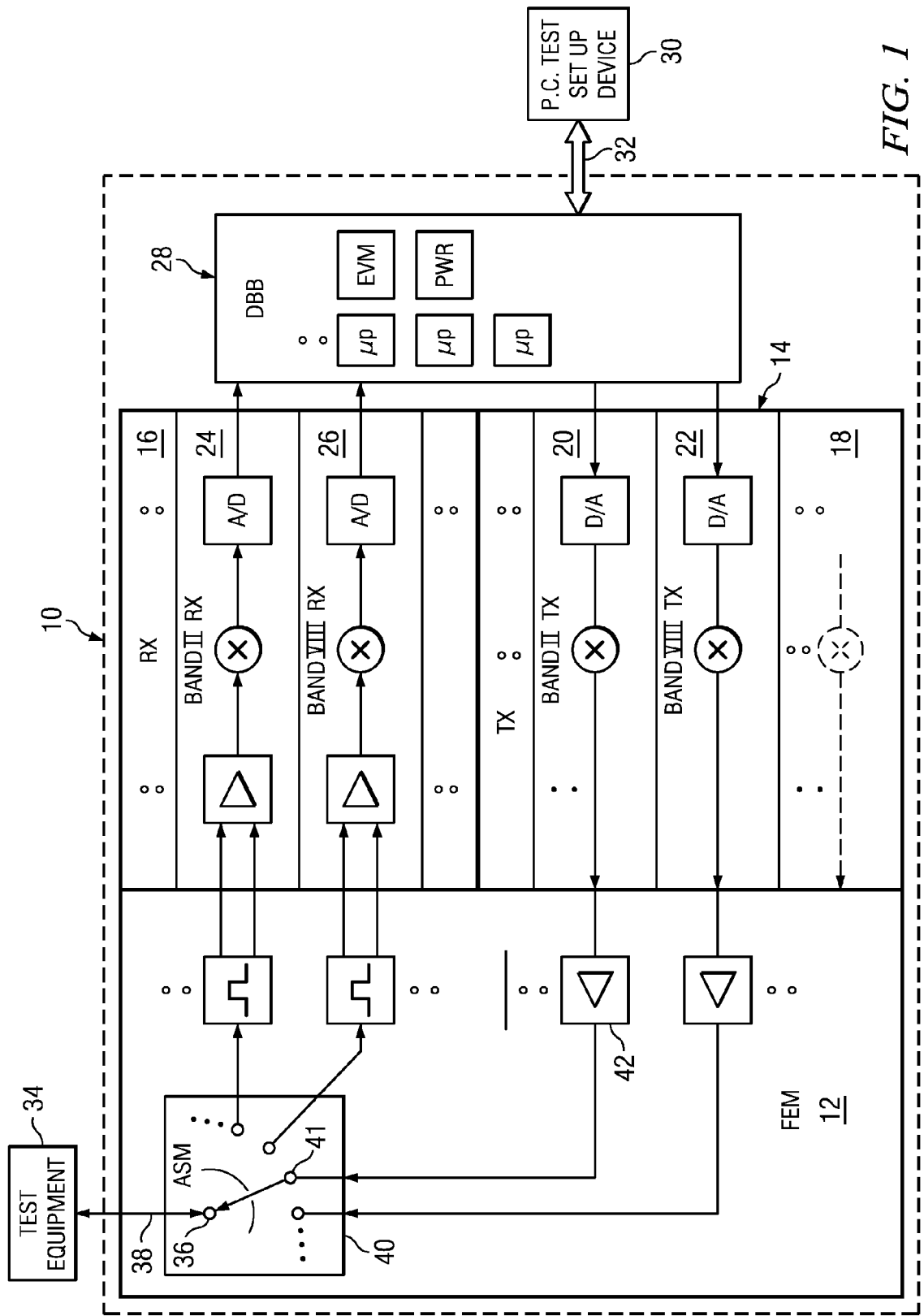
FIG. 1 illustrates a mobile radio device's transmission chain being tested by an external test and measurement equipment.

Referring now to the drawings, wherein like reference numbers are used herein to designate like elements throughout, the various views and embodiments of a 2G, 2.5G RF loopback arrangement for advanced mobile device self-testing are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

With the advancement of mobile device circuitry, there now exists enough processor power within many mobile communication devices, including smart phones, to perform many of the tests that have been traditionally performed by external test and measurement equipment. Transmission chain related RF tests can be performed in embodiments of the invention by looping back a transmitted RF carrier within the mobile device's transmit and receive circuitry so that self testing of the transmit chains can be performed without using external test and measurement equipment. Embodiments of the present self test method provide a transmit chain RF loopback arrangement wherein the transmitted signal will not be distorted by the out of band amplitude and phase ripple that could be produced by the same Band receive chain's bandpass filter. In a nutshell, embodiments are achieved by transmitting receive Band frequencies via a selected transmitter chain, attenuating and looping new transmitted signal back through a selected receiver chain. The result is a high quality self test performed by a selected receiver chain and the digital baseband block of a mobile device's circuitry. The high quality self tests that can be performed include, but are not limited to, transmit EVM, transmit ACPR, transmit power measurement, and modulated spectrum analysis. An exemplary method in accordance with the invention configures a mobile communication device's hardware in a fashion such that the mobile communication device's circuitry can self estimate its transmit EVM, transmit power and modulated spectrum. Embodiments of the invention are adapted to work with 2G and 2.5 G communication modes and Bands.

Figure 2:
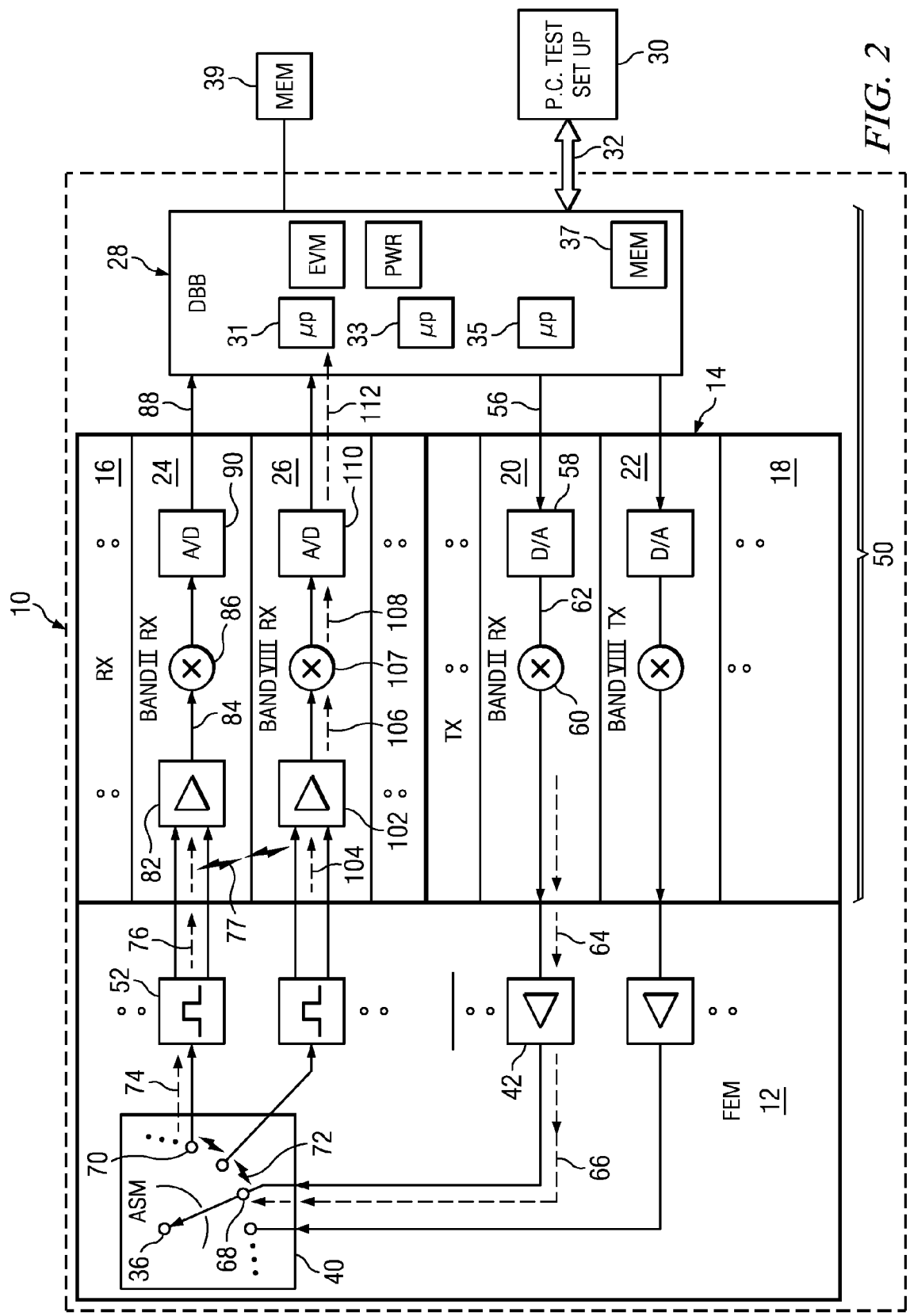
FIG. 2 illustrates a mobile radio device's transmission chain being self tested by the mobile radio device's receiver chain circuitry and digital baseband block.

Referring now to FIG. 2, a mobile communication device 10 is depicted wherein the digital baseband block 28, the mobile radio circuitry 14 and the front end mobile (FEM) 12 are shown in block diagram detail. Additional electronics and aspects of an exemplary mobile communication device 10 are not depicted in FIG. 2 for simplification and clarity purposes, but one of ordinary skill in the art will understand that additional circuitry and elements are contained within an exemplary mobile communication device 10. In some of the embodiments the FEM 12, the mobile radio circuitry 14 and the digital baseband block 28 are each separate circuits or chips. Yet in other embodiments, the mobile radio circuitry 14 and digital baseband block 28 may be comprised into a single integrated chip or circuit 50.

It is well known that 2G and 2.5G transmission band frequencies are different from their paired receive Band frequencies. For example for Band II, the transmission band frequency ranges from 1850 to 1910 megahertz, while the receive Band II frequency range is between 1930 to 1990 megahertz. Thus, without going into the specific details of looping back techniques, it would be understood that a Band II transmit chain 20 that outputs a modulated baseband signal to be received by a Band II receive chain 24 bandpass filter 52 would be severely degraded in amplitude and phase because the Band II receive bandpass filter 52 response would be out of band (i.e., the Band II receive bandpass filter will pass 1930 to 1990 megahertz, but will severely degrade the Band II transmit channel frequencies outside of its pass band).

Figure 3:
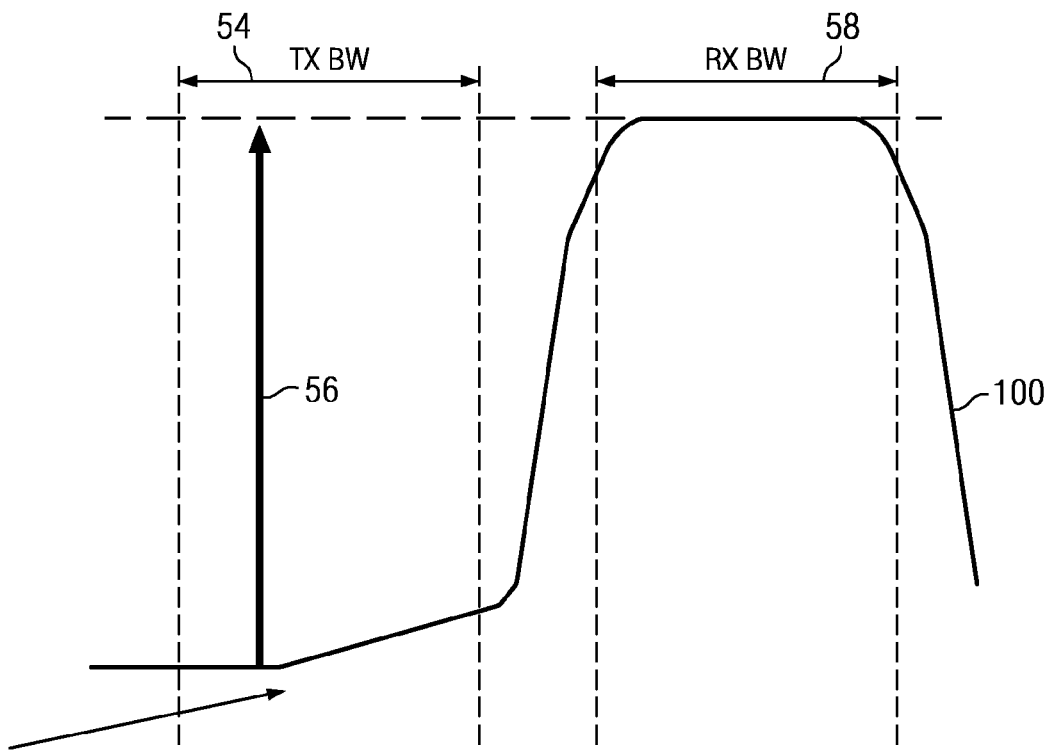
FIG. 3 illustrates a graph of what happens when a selected transmission Band channel is filtered by a bandpass filter having the same Band's receive bandwidth.

Referring momentarily to FIG. 3 we see the transmit bandwidth of, for example, the Band II transmit frequency range 54 and a channel 56 within the Band II frequency range 54 being transmitted by the band II transmitter chain 20. The Band II receive bandwidth 58 is shown such that the Band II receive bandpass filter response 100 has a similar pass band as the Band II receive bandwidth 58. Thus, the Band II transmit channel 56 would have its amplitude and phase severely degraded by the Band II receive and pass filter 100 prior to entering the Band II receiver chain 24.

In a first embodiment of the exemplary method of the invention, a PC test set-up device 30 is connected to the mobile device circuitry via a bidirectional bus 32. The bidirectional bus 32 could be a variety of buses including a USB or another type of bidirectional bus.

The PC test set-up device 30 comprises, among other common electronics found in a PC, a memory storage device that may store instructions or parameter that can be read by the one or more processor circuits 31, 33, and 35 in the base band block 28. The PC test set-up device selects and provides a plurality of parameters and/or instructions to set various circuit elements in the mobile device circuitry, via the processors 31, 33 35 in the base band block 28, such that a loopback self test for a selected transmission chain 20, 22 can be performed. In other embodiments instructions and/or parameters are stored in a memory circuit 37 with the base band block 28 or a storage device 39 associated with the digital base band block 28. The storage device 37 or 39 is a processor readable medium that is electronically coupled to at least one of the processors 31, 33, 35. The instructions and/or parameters stored in the storage device 37 or 39 are configure to cause at least one of the processor to perform certain testing steps when the PC test set-up device requests a certain test, for example test #59, to be performed.

In a first embodiment the PC test set-up device 30, which may be a basic personal computer or other comparable configurable controller device, directs the digital baseband block 28 to provide a digital baseband signal 56 to a selected RF transmit circuit portion of the mobile device circuitry. The selected RF transmit circuit portion may be, for example, the Band II transmitter chain 20. Thus, the digital baseband signal 56 is provided to a digital to analog converter 58 and converted into an analog baseband signal 62.

The analog baseband signal is then modulated in the up-mixer 60 with a band II receive channel frequency that is selected or prescribed by the PC test set-up device 30. When not operating in a self-test mode, the up-mixer 60 would modulate the analog baseband signal 62 with a Band II transmit channel frequency instead of a Band II receive channel frequency, but while in self-test mode the analog baseband signal 62 may be modulated on a Band II receive channel frequency in order to be ultimately received by a receiver chain within the receiver circuitry 16. Thus, a modulated baseband signal 64 is transmitted from the selected transmitter chain 20, but it is modulated on a mobile device receive channel frequency (rather than a base station receive channel frequency). The modulated baseband signal 64 is then amplified by a power amplifier 42 to produce an amplified modulated base band signal 66. The power amp 42 may amplify the amplified modulated baseband signals 66 to be about up to 2 watts or 33 dBm in 2 G operation. The amplified modulated base signal 66 is provided to an input node 68 of the ASM 40. The PC test set-up device 30 has provided instructions for the ASM to have the receiving input node 68 switched to connect with the antenna node 36, but the antenna node 36 is not connected to anything and has a high impedance. The external test and measurement equipment 34 is not needed or used during this exemplary self-test method and is therefore not connected to the antenna node 36. Typically, the ASM 40 cannot connect the input node or port 68 to, for example, an output node or port 70. The ASM 40 is not capable of connecting one input port to an output port therein. Instead, the ASM 40 can connect an input port or an output port to the antenna node 36. As such, the input node or port 68 is not connected or in direct signal connection with the output port 70 (i.e., the input port 68 and output port 70 are isolated from each other). However, because the transmit input port 68 and the receive output port 70 are substantially proximate or near to each other within the very small ASM 40 component circuitry, then some of the power in the amplified modulated baseband signal 66 connected to the input port 68 leaks (indicated by the lighting bolt symbols 72) and is received as an attenuated modulated baseband signal 74 at the output node or port 70 of the ASM 40. There typically will be about 20 dB to 30 dB of isolation between the input port 68 and the output port 70. Thus, the attenuated modulated baseband signal 74 will be attenuated from about 20 to 30 dB below the 33 dBm of the amplified modulated baseband signal 66 provided by the power amp 42. The attenuation between input node 68 and output node 70 is important because the receiver circuitry 16 is not designed to receive a 33 dBm signal provided by a transmit output chain, such as from the Band II transmitter chain 20 in combination with the power amp 42 in the front end module 12. The attenuated modulated baseband signal 74 is provided to the Band II receive bandpass filter 52. Since, in this exemplary self-test method, the Band II transmitter chain 20 transmitted a modulated baseband signal that was modulated with a receive channel frequency within the Band II receive bandwidth, the Band II receive bandpass filter 52 will output the bandpass-filtered attenuated modulated baseband signal as a loopback signal 76. The loopback signal 76 will not be significantly distorted in amplitude or phase because it is within the pass band of the bandpass filter 52.

Figure 4:
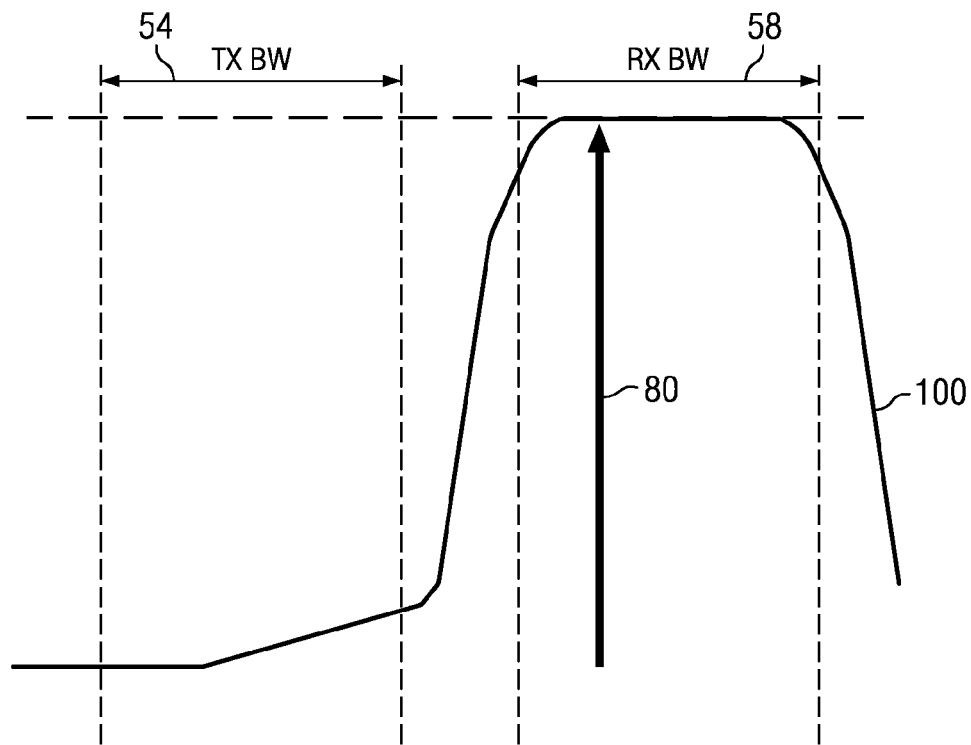
FIG. 4 depicts a graph of how a selected transmitted receive Band channel is filtered by a bandpass filter having the same Band's receive bandwidth.

In this first embodiment, the loopback signal 76 is provided to a Low Noise Amplifier (LNA) 82 in the Band II receiver chain 24. Referring for a moment to FIG. 4, the transmit bandwidth 54 for Band II is shown. Since the Band II transmitter chain 20 did not transmit a modulated baseband at a Band II transmit channel frequency in the exemplary self test method, there is no Band II channel shown in the transmit bandwidth 54. Instead, since the Band II transmitter chain 20 transmitted a modulated baseband at a receive channel frequency, a Band II receive channel 80 is shown within the receive bandwidth 58. Since the Band II receive bandpass filter 52 has a Band II pass band 100, the attenuated modulated baseband signal that is modulated at the selected Band II channel frequency 80 can pass through the Band II receive bandpass filter 52 and be provided to the input of the Band II low noise amplifier (LNA) 82. It should be understood that the Band II receive bandpass filter 52 may attenuate the loopback signal 76 by one or two dBs. If the signal strength of the loopback signal is attenuated enough at the ASM 40, then the signal that goes through the Band II bandpass filter 52 will have a fairly flat bandpass response. Furthermore, the loopback signal 76 will not be significantly distorted in amplitude or phase by Band II LNA 82 to output signal 84, which will be demodulated by the Band II down mixer 86 and converted into a received digital baseband signal 88 by the Band II analog to digital converter 90. Thus, EVM, power, ACPR and modulated spectrum estimation computations may be performed by the mobile device's digital baseband block 28. If the DBB block's calculations of the transmit EVM, the transmit ACPR, the modulated spectrum estimation and transmit power of the selected transmit chain for the selected Band channels is within a predefined range the mobile device may display a pass indication on its display screen (not specifically shown), otherwise a fail indication may be displayed. In other embodiments, the calculated EVM, ACPR and other related data may be provided via the bidirectional bus 32 to the PC test set-up device 30 wherein the pass or fail determination is determined and/or recorded.

This loopback method is possible in an exemplary mobile device 10 because the power amp 42 and the components of the RF transmit chain 20, 22 are designed to be broadband capable components (meaning the electrical frequency response characteristics at transmit and receive Band frequencies are very much the same in the broadband amplifiers and other devices because they are designed to operate in a broad spectrum or broadband of frequencies).

However, this first exemplary loopback self test method may have a limitation in certain circumstances. In some circumstances the loopback signal 76 may have an amplitude that is too high for the LNA 82. More specifically, the amplitude of the loopback signal 76 may be from zero to about 10 dBm, assuming 20 to 30 dB attenuation between the input port 68 and the output port 70 of the ASM due to the isolation between the input and output ports. If the loopback signal 76 is not attenuated enough prior to being received by the direct signal coupled LNA 82, then the power or amplitude of the loopback signal will create non-linearity in the receive chain components, which will prejudicially affect any EVM or modulated spectrum estimation calculations by the digital baseband block 28. As such, a second exemplary loopback self-test method embodiment is provided hereinbelow. Still referring to FIG. 2, the second exemplary loopback self test method will now be described.

To clarify a few items, it is understood that the output of the Band II transmitter chain 20, which provides the modulated baseband signal 64 is at about 0 dBm. That signal is amplified by the power amp 42 to about 1 watt, which is about 30 dBm. The amplified modulated baseband signal 66 is then provided to the input node 68 of the ASM 40, but due to the isolation between the input node or port 68 and the output node or port

70, the amplified modulated baseband signal is attenuated by about 20 to 30 dB. Thus, the attenuated modulated baseband signal 74 is between about 0 and 10 dBm. After being filtered by the Band II receive bandpass filter 52, an additional 1 dB or two may be lost, thus the loopback signal 76 may be between about −1 to about 9 dBm on the direct signal connection to the input of the Band II low noise amplifier 82 in the Band II receiver chain 24. The low noise amplifier 82 is a linear amplifier, which means that the Band II LNA output signal 84 should not be distorted with respect to amplitude or phase of the input loopback signal 76 at the input of the band to LNA 82 if the signal dBm is not too high. Thus if the input signal, being a loopback signal 76 is near or greater than 0 dBm, then in some mobile communication receive chain circuitry the Band II LNA 82 may be operating near the electrical and physical limits of its capabilities thereby distorting the output signal 84. Distortion of the LNA output 84 will have a detrimental affect on the transmit dBm power and ACPR calculations performed by the digital baseband block 28 and/or the data received by the PC test set-up device 30.

Still referring to FIG. 2, in the second exemplary embodiment of an exemplary test method, the method of self testing a transmit chain circuitry begins similarly to the previous described exemplary method. That is, the PC test set-up device 30 provides test instructions via the bidirectional bus 32 to the mobile device circuitry. The test instructions further tell a selected transmit chain 20 to transmit a modulated baseband signal that is in the selected Band that is being tested, but is a selected channel within the receive Band frequency of the selected Band. For example, referring to Table 1 instead of the transmitter chain 20 transmitting a channel at a selected frequency within the Band II transmit 1850 to 1910 megahertz range, the modulated baseband signal that is being provided by the transmitter chain 20 is a selected channel within the Band II receive frequency range of 1930 to 1990 megahertz. The modulated baseband signal 64 is output from the Band II transmitter chain 20 at about 0 dB and then amplified by the power amp 42, which is of broadband design, to produce a 1 watt or about 30 dBm modulated baseband signal 66. The test set-up instructions will have set the ASM 40 to be switched between the input node 68 for the selected transmit chain circuit under test and the antenna node 36 of the ASM 40. Due to a 20 to 30 dBM isolation between the input node 68 and an output node 70, the amplified modulated baseband signal 66 is attenuated about 20 to 30 dB at the output port 70 and provided as an attenuated modulated baseband signal 74 to the Band II receive bandpass filter 52.

Referring briefly to FIG. 4, one can see that the selected channel 80, which is within the selected receive bandwidth Band 58, will pass through the receive bandpass filter's pass band, shown as line 100. It should be noted that the signal may lose one to two dB as it passes through the receive bandpass filter 52. The output of the Band II receive bandpass filter 52 is the loopback signal 76, which will be at or about −1 to 9 dB.

Since the Band II LNA 82 may not be able to amplify a signal of between about −1 dBm and 9 dBm without creating a distorted output signal, the PC test set-up device provides test set-up instructions to turn off the Band II LNA 82. Meanwhile, the test set-up instructions turn on an adjacent or proximate LNA 102. In the design of the mobile radio circuitry 14 on the mobile radio circuitry chip 14 or mobile radio and DBB block chip 50 the LNA devices at the input of the receive chains 24, 26 are positioned such that each of the LNA's inputs, input nodes or input traces are next to or substantially proximate to each other. As such, there is about 30 to 40 dBs of isolation between the adjacent inputs of two LNAs. The loopback signal 76 is attenuated as a leakage signal 77 (depicted as lightning bolt symbols) and received as an attenuated loopback signal 104 at the input of an adjacent LNA 102, which in the exemplary depicted embodiment is the input LNA for a Band VIII receive chain 26. The loopback signal 76 will be attenuated to about a −30 to −40 dBm signal. As such, attenuated loopback signal 104 will be within about a −20 to −40 dBm range, which is within a safe range where the Band VIII LNA 102 will operate linearly, meaning that the Band VIII LNA output signal 106 will not be distorted in amplitude or phase. The LNA output signal 106 can be down converted by the Band VIII down converter mixer 107, which has been instructed to down convert at a different local isolator frequency than normally used for Band VIII channels. The different local isolator frequency is set by the test set-up instructions such that the Band VIII down mixer 107 operates at the down convert frequency needed for the selected Band II channel frequency being received. The down converted baseband signal 108 is output from the down mixer 107 and provided to the analog to digital converter 110. The received digital baseband signal 112 is then provided to the digital baseband block 28 so that EVM and transmit power calculations can be performed and pass/fail information may be displayed on an exemplary mobile device 10 display screen (not specifically shown) or provided as digital data to the PC test set-up device 30 via the bidirectional bus 32 where transmit EVM, power, ACPR and modulated spectrum estimation calculations can be performed to determine whether the mobile device circuitry within the mobile device 10 passes or fails the transmit chain test for the selected transmit chain. As such, the mobile device's circuitry performed an advanced set of self tests on a selected Band transmit chain without connecting the antenna node to an expensive and slow piece of external test and measurement equipment.

The exemplary methods can then be similarly repeated for one or more channels within each Band of each transmit chain thereby further performing advanced transmit chain tests via a self test method on one or a plurality of selected mobile device circuitry transmit chains. The self tests are performed and made possible by transmitting a modulated baseband signal at a selected receive Band channel frequency using a loopback technique that takes advantage of the isolation between input and input nodes of the ASM circuitry 40, uses selected receive Band circuitry chains in the mobile radio circuitry of the mobile device to potentially further attenuate the receive loopback signal and also utilizes the computational power of the digital baseband block 28. No external test and measurement equipment 34 is required to probe the antenna port of the mobile communication device circuitry.

Furthermore, it should be understood that embodiments of the exemplary methods are further made possible because the power amps in the FEM (e.g., power amp 42) are of a broadband frequency design as well as having the LNA devices in the receive chains being of broadband design and/or having their input traces or inputs for each of the receive Band chains LNA's being adjacent and/or proximately located to each other on the mobile radio circuitry chip portion of the mobile radio circuitry chip and/or the mobile radio circuitry and DBB block chip 14 50.

Even though the transmit Band frequency range and the receive Band frequency range are different for the same Band in embodiments of the exemplary test methods, since the power amp in each transmit chain is a broadband power amp and the transmit and receive frequency ranges for the channels in a same Band are only a few tenths of a megahertz apart, and since the broadband design of the LNAs in the receive chains each will operate correctly and substantially the same between about 800 megahertz and 2.2 gigahertz (which is the frequency range for all of the 2G and 2.5 G operating bands) the novel exemplary self test methods work. Thus, the transmit chain is being properly tested via the exemplary self test methods even though a receive band frequency is being transmitted by the selected transmit chain under test.

Referring now to FIG. 5 a flow chart of an exemplary self test method in accordance with embodiments of the invention is provided. The exemplary self test method may be repeated for various 2G and 2.5 G operating Bands and channels therein. The exemplary self test may also be performed on different selected transmit chains within the transmitter circuitry 18 and module circuitry 12 of mobile device circuitry. After beginning 200 an exemplary self test method a personal computer or test computer device 30 is connected to the mobile device circuitry under test. At step 210 the test computer 30 prescribes self test instructions to the mobile device circuitry. The test instructions may include a single test instruction such as, for example, perform test #541, which would be interpreted by the mobile device circuitry to perform a pre-specified transmit chain self test using a pre-specified selected channel within preselected operating Band frequency, interpreted to set the ASM 40 switch position and set various local isolator frequencies for use by up mixers and down mixers of selected transmit and receive chain circuitry for the specified self test. In other embodiments, the test instructions may specifically provide the selected parameters for the particular self test to be performed. That is, provide which transmit Band chain circuit is to be tested, what the up mixer frequency should be set to in the selected transmit chain, how the ASM should be switched, which receive chain LNA should be turned on and which should be turned off as well as what the local isolator frequency for the selected receive chain should be set at for the particular self test.

At step 212, the digital baseband block provides a digital baseband signal to a selected transmit chain. At step 214, the selected transmit chain converts the digital baseband signal via a digital to analog converter, to an analog baseband signal. An up mixer then modulates the analog baseband signal to a selected receive channel frequency within the selected receive Band. At step 216, a broadband power amp within the front end module circuitry amplifies the modulated baseband signal by, for example, about 30 dBm or about 1 watt. The power amp is of a broadband design such that it is not limited to the only amplifying frequency range of a specific Band. Instead, the power amp, being of broadband design can amplify, without distortion, the frequency range of at least both the selected transmit Band transmit frequency and receive frequency ranges. For example, if the Band II transmit circuitry chain is being tested, the power amp 42 has a broadband design that enables it to amplify frequencies ranging from 1.8 gigahertz to about 2 gigahertz without distortion. In some designs, the power amps in the front end module may be able to amplify, without distorting the transmit and receive frequency ranges for all the 2G and 2.5 G operating bands (i.e., 824 megahertz to 2170 megahertz).

At step 218, the amplified modulated baseband signal is received at an input node or port of an ASM 40 within the front end module circuitry 12. The instructions from the test set-up device 30 will have set the antenna node or port of the ASM connected to the input node receiving the amplified modulated baseband signal of the transmit chain circuitry under test. At step 220, an output node or port of the ASM, which is isolated from the input node receiving the test signal, receives an attenuated baseband signal in the form of signal leakage from the input node. The received attenuated modulated signal is attenuated between about 20 and 30 dB. At step 222, a receive Band bandpass filter in the receive chain path of the selected Band under test filters the attenuated modulated baseband signal and provides or outputs a loopback signal.

At step 224, the loopback signal is received via signal leakage at an LNA input of a selected band receiver chain circuit. The LNA input may be adjacent to another LNA input that is in the direct signal path of the receive bandpass filter output and the loopback signal. Thus, the LNA (rather than the other LNA) receives an attenuated loopback signal at its input. The attenuated signal may be attenuated by about 30 to 40 dB, which will allow the LNA to operate without distorting the phase or amplitude of the now attenuated loopback signal. In some embodiments, the other LNA that is in direct signal connection with the output of the bandpass filter and loopback signal may be turned off. Yet in other embodiments, the other LNA, which is in the direct signal connection with the receive bandpass filter and loopback signal, receives an unattenuated loopback signal from the output of the receive bandpass filter.

At step 226, the selected receive Band circuitry demodulates the output from the LNA via a down mixer to create a received analog baseband signal. At step 228, the received analog baseband signal is converted by an analog to digital converter into a received digital baseband signal 112. At step 230, the received digital baseband signal is provided to the digital baseband block so that a transmit EVM and a transmit power computation can be performed. The output of the computation may be displayed on a display screen of the mobile device under test or may be provided as data to the PC test set up device where a determination as to whether the transmit chain under test passes or fails the particular self test at step 232. The method can be repeated for multiple channels in the same Band and for multiple channels in different transmit Bands such that the data provided to the PC test set-up device can determine or estimate the transmit EVM, the transmit ACPR, the transmit power and the modulation spectrum of the various transmit chain circuits to thereby determine if the overall transmit chain circuitry portion of the circuit under test passes or fails the exemplary advanced transmit chain self test.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the concepts and scope hereof, as defined by the following claims. Thus, it is intended that the following claims be interpreted to embrace all such further modifications, changes, rearrangements, substitutions, alternatives, design choices, and embodiments.

What is claimed is:

1. A method of self testing a transmission chain in a mobile phone radio device, the method comprising:
producing, by an RF transmit circuit portion of the mobile phone radio device, a modulated baseband signal within a preselected channel within a preselected receive frequency band;
amplifying the modulated baseband signal;
providing the amplified modulated baseband signal to a first node of an antenna switch module;
receiving a first attenuated signal on a second node of the antenna switch module via a first leakage signal path between the first node and the second node, the first node and the second node not being on a same electrical signal path, the first attenuated signal comprising an attenuated version of the amplified modulated baseband signal;
filtering the first attenuated signal by a first bandpass filter adapted to pass the preselected receive frequency band, the first bandpass filter outputting a loopback signal, the loopback signal being a first bandpass filtered version of the first attenuated signal;
receiving the loopback signal by a first Low Noise Amplifier (LNA) in a first RF receive circuit portion of the mobile phone radio device, the first LNA receives an attenuated loopback signal via a second leakage signal path that is between the first bandpass filter and the first LNA, the first LNA is not in a same receive signal oath as the first bandpass filter, the first LNA is adjacent to a second LNA wherein the second LNA is in a same direct receive signal path past the first bandpass filter, the first leakage signal path being in series with the second leakage signal path;
producing, by the first RF receive circuit portion, a received digital representation of the baseband signal from the attenuated loopback signal;
calculating by a Digital Base Band (DBB) block a transmit quantification measurement of the RF transmit circuit portion using the received digital representation of the baseband signal.

2. The method of claim 1, further comprising calculating by the DBB block a transmit Adjacent Channel Power Ratio (ACPR) of the RF transmit circuit portion using the received digital representation of the baseband signal.

3. The method of claim 1, further comprising calculating by the DBB block transmit power associated with the RF transmit circuit portion using the received digital representation of the baseband signal.

4. The method of claim 1, wherein the first attenuated signal is between 20 dB and 40 dB below the amplified modulated baseband signal.

5. The method of claim 1, wherein the loopback signal attenuates between 20 dB and 40 dB via the second leakage signal path between the first bandpass filter and the first LNA.

6. The method of claim 1, further providing self test instructions from an external computer to the mobile phone radio device.

7. The method of claim 1, wherein the modulated baseband signal is a 2G or 2.5G RF signal.

8. A method of self testing a transmission chain in mobile device radio circuitry, the method comprising:
producing a baseband signal by the DBB block, the DBB block being within the mobile device radio circuitry;
receiving the baseband signal by a predetermined RF transmit circuit chain within the mobile device radio circuitry;
modulating the baseband signal to produce a modulated baseband signal within a predetermined first channel of a first frequency band;
amplifying the modulated baseband signal;
receiving the modulated baseband signal at a first node of an antenna switch module within the mobile device radio circuitry;
receiving the modulated baseband signal as a first attenuated modulated baseband signal at a second node of the antenna switch module via first RF signal leakage from the first node to the second node;
filtering the first attenuated modulated baseband signal by a bandpass filter that is adapted to pass a modulated baseband signal within the first frequency band and to output a loopback signal, the loopback signal being the filtered and attenuated modulated baseband signal;
receiving, via a second RF signal leakage that is in series with the first RF signal leakage, the loopback signal as an attenuated loopback signal by a predetermined RF receive chain within the mobile device radio circuitry and demodulating the attenuated loopback signal to produce a received baseband representation of the baseband signal produced by the DBB block.

9. The method of claim 8, further comprising:
providing the received baseband representation to the DBB block;
calculating by the DBB block the error vector magnitude (EVM) of the predetermined RF transmit circuit chain using the received baseband representation of the baseband signal produced by the DBB block.

10. The method of claim 8, wherein the predetermined RF receive chain is not in a direct signal connection with the output of the bandpass filter.

11. The method of claim 8, wherein the predetermined RF receive chain is not in a direct signal connection with the output of the bandpass filter, and wherein the predetermined RF receive chain receives the loopback signal as the attenuated loopback signal via the second RF signal leakage from an output node of the bandpass filter.

12. The method of claim 8, wherein the first attenuated modulated baseband signal is attenuated from about 20 dB to about 40 dB below the modulated baseband signal.

13. The method of claim 8, wherein amplifying the modulated baseband signal is performed by a broadband amplifier.

14. The method of claim 8, wherein the predetermined RF receive chain receives the loopback signal via a broadband Low Noise Amplifier (LNA) adapted to accurately amplify 2G or 2.5G transmit or receive band frequencies.

15. The method of claim 11, the predetermined RF receive chain is adjacent to another RF receive chain that is in direct signal connection with the output of the bandpass filter.

16. The method of claim 11, wherein the attenuated loopback signal as attenuated from about 20 dB to about 40 dB below the loopback signal.

17. A system for self testing a transmission chain in a mobile phone radio device, the system comprising:
a digital base band block comprising at least one processor;
a transmit chain adapted to receive a test signal from the digital base band block;
a receive chain adapted to provide a received test signal to the digital base band block;
an antenna switch module connected to receive a transmit signal from the transmit chain at a first node of a plurality of nodes and a switch control signal from the digital base band block;
a processor readable medium electronically coupled to the at least one processor;
and
a plurality of instructions, wherein at least a portion of the instructions are storable in the processor readable medium, and further, wherein the plurality of instructions are configured to cause at least one processor to perform:
instructing the base band block to produce a base band test signal;
instructing the transmit chain to receive the base band test signal from the baseband block;
instructing the transmit chain to modulate the base band test signal to produce a modulated base band test signal within a first channel of a selected receive frequency band; and
instructing the antenna switch module to be configured to switch to the first node;

transmitting, via a first RF leakage signal established between the first node and a second node, the modulated base band test signal which is an attenuated modulated baseband test signal at the second node;

instructing a first receiving circuit of the receive chain to receive a loopback signal from the second node of the antenna switch module, wherein the loopback signal comprises the attenuated modulated base band test signal, and wherein the receive chain comprises the first receiving circuit and a second receiving circuit operating in parallel;

instructing the second receiving circuit to receive an attenuated loop back signal from the first receiving circuit via a second RF leakage signal established between the first receiving circuit and the second receiving circuit, the first and second RF leakage signals being in series;

instructing the second receiving circuit of the receive chain to demodulate a received baseband test signal from the attenuated loopback signal and provide the received baseband test signal to the digital baseband block; and analyzing the received based band test signal.

18. The system for self testing a transmission chain in a mobile phone radio device of claim 17, wherein analyzing comprises calculating an error vector magnitude (EVM) of the transmit chain using the received base band test signal.

19. A method of self testing a transmission chain in a mobile phone radio device, the method comprising:

producing, by an RF transmit circuit portion of the mobile phone radio device, a modulated baseband signal within a preselected channel within a preselected receive frequency band;

amplifying the modulated baseband signal;

providing the amplified modulated baseband signal to a first node of an antenna switch module;

receiving a first attenuated signal on a second node of the antenna switch module via a first leakage signal path between the first node and the second node, the first node and the second node not being on a same electrical signal path, the first attenuated signal comprising an attenuated version of the amplified modulated baseband signal;

filtering the first attenuated signal by a first bandpass filter adapted to pass the preselected receive frequency band, the first bandpass filter outputting a loopback signal, the loopback signal being a first bandpass filtered version of the first attenuated signal;

receiving the loopback signal at an input of a first LNA in a first RF receive circuit, the first RF receive circuit being in the same signal path as the first bandpass filter;

receiving the attenuated loopback signal via a second leakage signal path at an input of a second LNA in a second RF receive circuit, the second leakage signal path being in series with the first leakage signal path and the second leakage signal being between the input of the first LNA and the input of the second LNA wherein the second RF receive circuit is not in a same receive signal path as the first RF receive circuit, the attenuated loopback signal being a further attenuated version of the amplified modulated baseband signal;

producing, by the second RF receive circuit, a received digital representation of the baseband signal from the attenuated loopback signal; and calculating by a Digital Base Band (DBB) block a transmit quantification measurement of the RF transmit circuit portion using the received digital representation of the baseband signal.

\* \* \* \* \*